March 21, 1933. A. J. MEHL 1,902,512
COMBINATION CONVEYER AND SCALE
Filed May 3, 1929 2 Sheets-Sheet 1
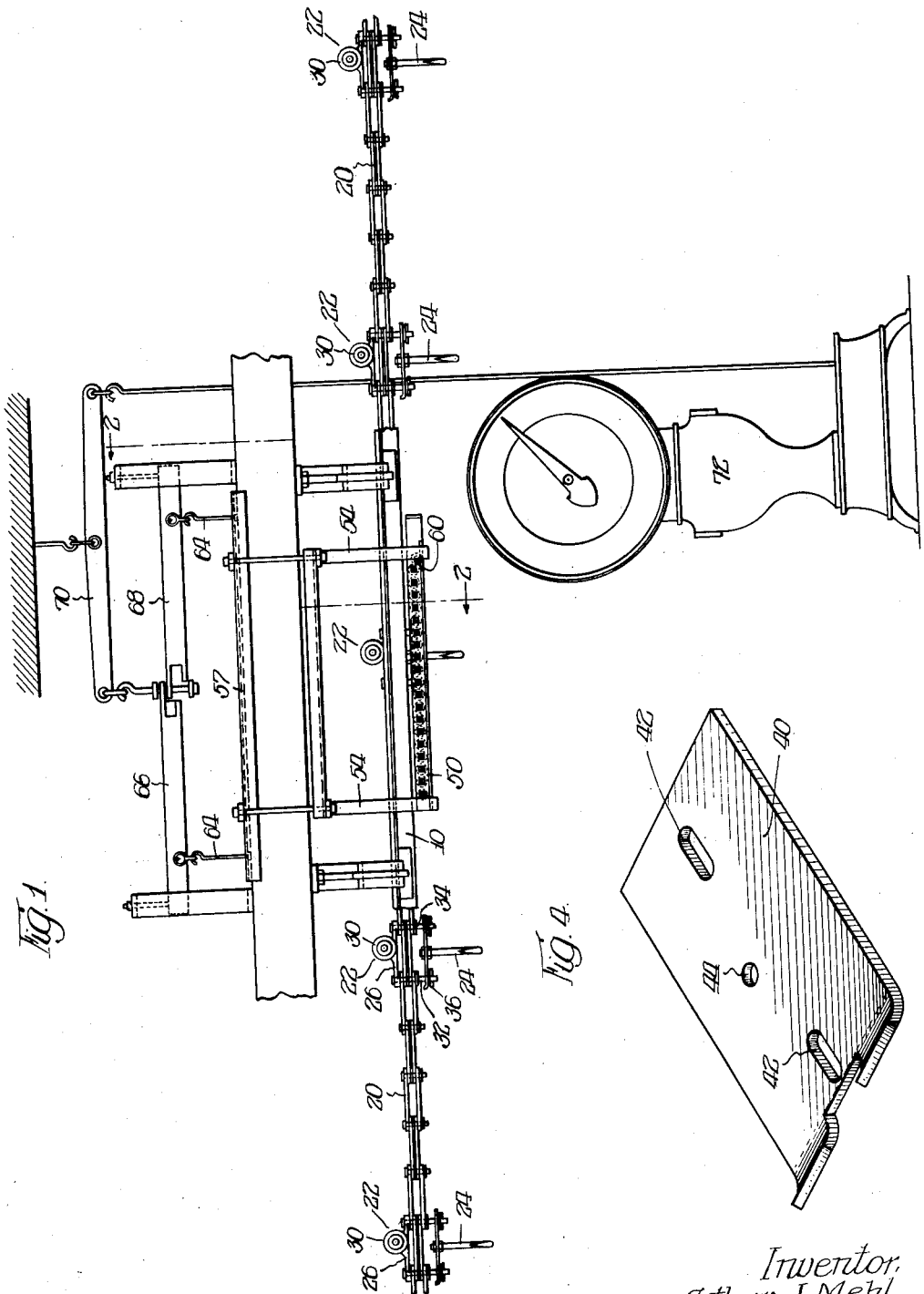
Inventor,
Arthur J. Mehl,
By Wilkinson, Huxley, Byron & Knight
Attys.

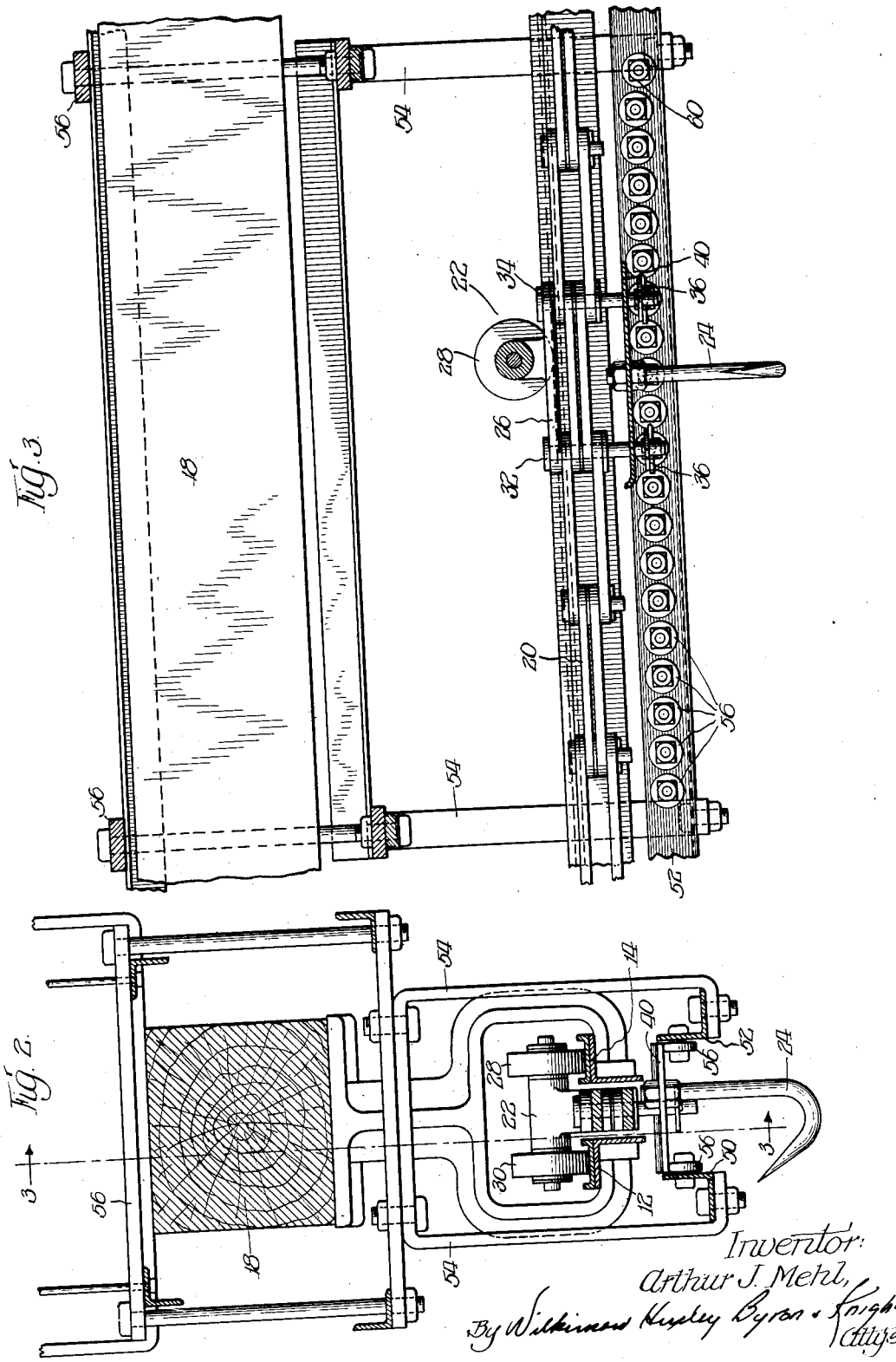

Patented Mar. 21, 1933

1,902,512

UNITED STATES PATENT OFFICE

ARTHUR JULIUS MEHL, OF OMAHA, NEBRASKA, ASSIGNOR TO SWIFT AND COMPANY, OF CHICAGO, ILLINOIS, A CORPORATION OF ILLINOIS

COMBINATION CONVEYER AND SCALE

Application filed May 3, 1929. Serial No. 360,073.

This invention relates to conveyers and the like, and is illustrated herein as embodied in a conveyer of the kind that is generally employed in packing plants and such, for transporting meats from one locality of the plant to another. More particularly, the invention relates to conveyers provided with means for weighing the meats in the course of their travel along the conveyer.

In the conveyers of the prior art, it has generally been customary to provide a conveyer track having a section that is free to move relatively to the main portion of the track and to attach a weighing apparatus to the independently movable section. In operation, the meats are carried on hooks over the conveyer track and when the hooks pass onto the independently movable section the travel of the hooks is momentarily suspended, the weighing operation is performed, and thereafter the hooks continue their travel. In most instances, the independently movable section is located normally in alinement with the remaining portion of the conveyer track, but this arrangement is subject to criticism for the reason that when one of the hooks having a piece of meat suspended thereon moves onto the movable section the latter drops downwardly owing to the increased weight being placed upon it and when the weighing operation is completed it is necessary to move the hook and the suspended meat upwardly to regain the level of the main portion of the track.

Having the foregoing considerations in mind, it is an object of the present invention to provide a conveyer in which the weighing operation is performed without interrupting the travel of the meat upon the conveyer. In a somewhat different aspect, an important object of the invention consists in providing a conveyer of this character having a continuous and uninterrupted track, by means of which the weighing operation is performed without allowing the hook and suspended meat to drop, and without necessitating the former operation of lifting the hook and meat at the completion of the operation to restore them to the level of the main portion of the conveyer track.

An important feature of the invention which tends toward the accomplishment of the recited objects consists in the provision of a conveyer comprising a continuous track, a plurality of meat suspending members carried by the conveyer and means associated therewith for weighing the meats suspended by the members, independently of the remaining parts of the conveyer. In the illustrated embodiment of the invention, a number of carriers are arranged to travel over a continuous conveyer track and these carriers are provided with hooks so mounted that the hooks may move relatively to the carriers upon reaching the weighing apparatus and be weighed independently of the carriers that are traveling along the track. Thus, the movement that is necessary in the weighing operation is not imparted to the carrier, nor to a movable section of track, but rather to the hooks or suspending members which in no wise interferes with the continuous travel of the carriers.

Other objects and features of the invention will become apparent from a reading of the following specification in the light of the accompanying drawings, in which—

Figure 1 is a view in front elevation of a fragment of a conveyer and a weighing apparatus constructed in accordance with the present invention;

Figure 2 is an end view partly in section of the conveyer apparatus disclosed in Figure 1;

Figure 3 is an enlarged view in front elevation with certain parts broken away, the more clearly to illustrate the relationship between the conveyer and the weighing apparatus; and Figure 4 is a view in perspective of one of the parts of the conveyer.

As shown in the drawings, the reference numeral 10 indicates a conveyer track and although only a fragment of the track is illustrated in the drawings, it is to be understood that the track is continuous and unbroken and may be of any length desired. As shown in Figure 2, the track is composed of a plurality of spaced angle irons 12, 14 that extend parallel to one another and are carried upon the inwardly extending lower extremities of brackets 16 which depend at intervals from an overhead beam 18.

Associated with the conveyer track 10, is a conveyer chain 20 of the ordinary double bar link variety and mounted at equal intervals along this chain are carriers 22 that are provided with suspension members 24 herein illustrated in the form of hooks. Each carrier comprises, generally speaking, an upper platform member 26 upon the opposite sides of which are mounted a plurality of wheels 28, 30, which are arranged to run over the conveyer track 10 and thereby to support the conveyer chain with respect to the track. Adjacent to the opposite ends of the platform 26 are connecting pins 32 and 34 constituting vertically extending guide rods or bars that extend through the links of the chain and thence below the chain to carry supporting washers 36 upon their lower extremities. Each carrier is provided with a sled, or slide bar, 40 of the type shown in Figure 4, and each of the sleds is provided with a plurality of openings 42 for receiving the shanks of the connecting pins or guide bars 32, 34. As will be observed, the openings 42 are somewhat elongated to permit a certain amount of play between the sleds and the pins upon which they are mounted. As shown in Figure 3, the suspension member, or hook, 24 extends through another opening 44 arranged approximately centrally of the plate lengthwise and offset sidewise in a direction opposite to that in which the bent extremity of the hook extends. So much of the description as has just been given relates to the conveyer only and it will be understood at this point that in the normal operation of the apparatus movement is imparted to the chain, the carriers 22 travel along with the chain, and the parts are supported by means of the spaced wheels running over the conveyer track. Furthermore, the hooks 24 are mounted on the lower side of the carriers 22 and through the provision of the plate 40 are free to move vertically relatively to the carriers and the conveyer chain and track.

Turning now to the apparatus for weighing the meats that are carried on the suspension members 24, the reference numerals 50, 52 (Figure 2) indicate a plurality of spaced angle irons suspended by suitable brackets 54 and arranged to carry on their inner opposed faces a series of alined rollers 56, as clearly shown in Figure 3. The tops of these rollers are disposed normally above the supporting washers 36 that are carried by the connecting pins 32, 34, and owing to this fact, in the normal operation of the apparatus, the sled 40, upon passing onto the rollers 56, is raised until it occupies a position about midway of the height of the exposed portion of the shanks of the connecting pins 32 and 34. It is to be observed from Figure 1 that the tracks 50 and 52 are short in length and actually comprise only sections. Also, let it be noticed that to facilitate the passing of the sled 40 onto the rollers, the rollers 60 at the entering end of the tracks 50, 52 are located somewhat lower than the adjacent rollers and the forward edges of the sleds are curved upwardly in the manner shown in Figures 3 and 4.

Thus, it will be seen at this point that in the ordinary operation of things the conveyer runs along until a carrier passes over that portion of the main conveyer track located above the sectional tracks whereupon the sled engages and rides upon the rollers 56 carried by the sectional tracks. Therefore, the entire weight of the sled and of the suspending member and whatever object is carried thereby are transferred from the carrier to the rollers and sectional tracks and so if the sectional tracks should be connected with weighing apparatus the weight carried by the suspension member could be accurately determined.

As hereinbefore pointed out, the conveyer is in fact provided with means for weighing the conveyed objects in the manner just outlined and as shown in the drawings, this is done, as shown in Figure 1, by connecting the spaced brackets 54 with an upper and lower longitudinal and transverse horizontal brackets 57 and 57' and vertical tie-rods 80, which, by means of hooks 64, 64, which are connected to a pair of fulcrumed arms 66, 68 that are joined at their central extremities to one end of a balancing beam 70 and the other end of the beam is connected to a suitable weighing apparatus 72.

Thus, any weight imparted to the rollers 56, or the spaced tracks 50 and 52, will cause those members to descend and the amount of such movement will be transmitted to the floor of the weighing apparatus with the result that the latter apparatus will be responsive to weight conditions that are imposed upon the tracks 50, 52.

And so in the use of the apparatus, the conveyer travels continuously over an unbroken track and the weight carried by the suspension members is determined independently of the other parts of the conveyer. By means of such a provision, the weighing is rendered more expeditious and likewise is the task of conveying the meats, or other objects, from point to point.

Although the invention has been described herein with particular reference to the transporting and weighing of meats and the like, it is to be clearly understood and appreciated that the invention is much wider in scope and application, and is most assuredly not to be limited to the type of goods transported. Similarly, from time to time, changes and modifications may be made in the illustrated embodiment of the invention without departing in the slightest from the true scope of the invention as outlined in the appended claims.

The angle irons 50 and 52 may be properly referred to and described as transversely spaced, parallel, longitudinally extending, platform supporting bars which are supported in said spaced relationship upon opposite sides of the path of travel of the hooks or supporting members 24 that depend from the central portion of the sled or plate member 40 by the stirrups or the bracket means that comprises the spaced brackets 54 of the weighing platform construction of the weighing means. It will be noted that the stirrup means straddles the conveying element whereby the parallel platform bars or angle irons 50 and 52 can be held upon opposite sides of the travel of the hooks 24 so that the opposite sides of the plate member or sled 40 can be lifted and the plate thus be held solely supported in lifted position through the medium of the anti-friction rollers 56 that are on the parallel platform supporting bars. It will also be noted that when the sled or plate 40 is thus held in elevated position, it can be moved horizontally or in a forward longitudinal direction under the influence of the vertically extending guide bars whereby the weighing operation can be carried out during this movement of the plate or sled without affecting the weighing operation which is carried out during this time.

Having thus described my invention, what I claim as new and desire to secure by United States Letters Patent, is:

1. Conveying and weighing means comprising in combination a horizontally moving conveying element having vertically extending guide rods depending therefrom, a horizontally extending plate normally supported from the lower ends of said rods but in a manner to permit movement of the plate in respect to its vertically extending guide rods, which said guide rods are relied upon to effect horizontal movement of the plate as the conveying element moves, a hook or supporting means depending from the central portion of said plate, and horizontally extending weighing platform bars supported and held in spaced parallel relationship in respect to each other by depending stirrup means that straddles the conveying element and that constitutes part of the weighing platform of the weighing means, said parallel weighing platform bars each having a series of longitudinally spaced rollers thereupon and being arranged in respect to the horizontally moving conveying element in such a manner that the opposite longitudinally extending edge portions of the plate during the travel of the plate past the weighing means must ride upon said series of rollers in a manner to be lifted thereby and to be completely supported thereby whereby a weighing operation can be carried out while the plate is being moved horizontally and while it is completely supported on the parallel weighing platform bars through the medium of said series of rollers thereupon.

2. In a conveying and weighing means, in combination, a continuously moving conveying element supporting a horizontally extending plate movable therewith but in a manner to permit vertical movement of the plate in respect to vertically extending guide bars with which the conveying element is provided and which guide bars are relied upon to effect continuous movement of the plate as the conveying element moves, a hook or supporting means depending from said plate, and horizontally extending platform bars supported and held in spaced relationship in respect to each other by stirrup means constituting part of the weighing platform of the weighing means, said platform bars each having a series of longitudinally spaced rollers thereupon and being arranged in respect to the continuously moving conveying element in such a manner that the opposite longitudinally extending edge portions of the plate during the travel of the plate past the weighing means must ride upon said series of rollers in a manner to be lifted thereby and in a manner to be completely supported thereby whereby a weighing operation can be carried out while the plate is being moved longitudinally and while the plate is completely supported on said bars of the weighing platform through the medium of said series of rollers thereupon.

3. An installation comprising a combined conveying and weighing means having in operative combination a continuous track comprising transversely spaced longitudinally and horizontally extending track members, an endless chain continuously movable along and in relation to said track members, longitudinally spaced longitudinally extending carrying members having supporting rollers at opposite sides thereof that travel along said track members, said endless chain being supported and carried by said carrying members by being connected to the ends of said carrying members, a set of spaced vertically extending guide rods secured to and carried by each of certain of said longitudinally extending carrying members, a sled or horizontally extending plate member for each of said sets of guide rods and slidably supported in association therewith, a supporting means or hook carried by and depending from said sled or plate member, a pair of parallel longitudinally extending platform members each having a series of longitudinally spaced anti-friction roller members thereupon, and longitudinally spaced supporting brackets constituting part of the weighing platform of the weighing means, by which brackets said longitudinally extending platform members are secured and carried in such a position and relationship that as said endless chain travels it causes through the medium of said guide rods the opposite side portions of said sled or plate to move upon and along the series of anti-friction roller members in a manner whereby each sled or plate is successively lifted from its support in respect to its companion or corresponding longitudinally extending carrying member while still being moved longitudinally under the influence of the moving guide rods, the construction being such that while each sled or plate is thus held in elevated position by the anti-friction roller members it is thereby supported in a substantially horizontal position while the weighing operation is being carried out.

4. An installation comprising a combined conveying and weighing means having in operative combination a continuous track construction comprising in at least a portion thereof transversely spaced longitudinally and horizontally extending track members, an endless chain movable along and in relation to said track members, longitudinally spaced carrying members having supporting rollers at opposite sides thereof that travel along said track members, said endless chain being normally supported and carried by said carrying members, a set of spaced vertically extending guide rods secured to and carried by each of certain of said longitudinally extending carrying members, a sled or horizontally extending plate member for each of said sets of guide rods and slidably supported in association therewith, a supporting means or hook carried by and depending from said sled or plate member, a pair of parallel longitudinally and horizontally extending platform members each having a series of longitudinally spaced anti-friction rollers thereupon and supporting brackets constituting part of the weighing platform of the weighing means and by which supporting brackets said longitudinally extending platform members are supported and held in place, the position and arrangement of said platform members being such that as said endless chain travels it causes opposite side portions of said sled or plate member to move upon and along the series of anti-friction rollers or rolling members in a manner whereby each sled or plate is successively lifted from its support in respect to its companion or corresponding carrying member while still being moved longitudinally under the influence of the horizontally moving vertically extending guide rods, the construction also being such that while each sled or plate member is thus held in elevated position by the anti-friction rollers, the plate is supported in a substantially horizontal position by means of said anti-friction rollers while the weighing operation is being carried out.

Signed at Omaha, Nebraska, this 26th day of April, 1929.

ARTHUR JULIUS MEHL.